US010284033B2

United States Patent
Janjic et al.

(10) Patent No.: US 10,284,033 B2
(45) Date of Patent: May 7, 2019

(54) ROTOR AND RELUCTANCE MACHINE

(71) Applicant: KSB Aktiengesellschaft, Frankenthal (DE)

(72) Inventors: Boris Janjic, Frankenthal (DE); Jochen Schaab, Frankenthal (DE)

(73) Assignee: KSB Aktiengesellschaft, Frankenthal (DE)

( * ) Notice: Subject to any disclaimer, the term of this patent is extended or adjusted under 35 U.S.C. 154(b) by 122 days.

(21) Appl. No.: 15/501,477

(22) PCT Filed: Aug. 4, 2015

(86) PCT No.: PCT/EP2015/067904
§ 371 (c)(1),
(2) Date: Feb. 3, 2017

(87) PCT Pub. No.: WO2016/020359
PCT Pub. Date: Feb. 11, 2016

(65) Prior Publication Data
US 2017/0222505 A1    Aug. 3, 2017

(30) Foreign Application Priority Data

Aug. 4, 2014    (DE) ......................... 10 2014 215 303

(51) Int. Cl.
| H02K 19/00 | (2006.01) |
| H02K 1/24  | (2006.01) |
| H02K 19/02 | (2006.01) |

(52) U.S. Cl.
CPC ............. *H02K 1/246* (2013.01); *H02K 19/02* (2013.01); *H02K 2213/03* (2013.01)

(58) Field of Classification Search
CPC ............................... H02K 1/246; H02K 19/02
(Continued)

(56) References Cited

U.S. PATENT DOCUMENTS

| 5,818,140 A | 10/1998 | Vagati |
| 6,121,706 A | 9/2000  | Nashiki et al. |

(Continued)

FOREIGN PATENT DOCUMENTS

| CN | 1420606 A      | 5/2003 |
| CN | 1427527 A      | 7/2003 |
| DE | 1 638 449 A1   | 8/1971 |
| DE | 199 34 033 A1  | 2/2000 |
| DE | 10 2013 201 353 A1 | 8/2013 |
| EP | 1 130 746 A1   | 9/2001 |

OTHER PUBLICATIONS

International Search Report (PCT/ISA/210) issued in PCT Application No. PCT/EP2015/067904 dated Nov. 24, 2015 with English-language translation (four (4) pages).

(Continued)

*Primary Examiner* — Hanh N Nguyen
(74) *Attorney, Agent, or Firm* — Crowell & Moring LLP (57) ABSTRACT

A rotor for a reluctance machine is provided. The rotor includes a soft magnetic element which is cylindrical in shape. The soft magnetic element has recesses forming flux barriers. At least part of the recesses are filled with an electrically conducting and magnetically non-conducting filler material such that a starting cage is formed in a peripheral region of the rotor. The ratio of the surface of the filled region of the flux barriers to the surface of the region of the unfilled flux barriers is at least 0.2 for at least one rotor cycle.

12 Claims, 7 Drawing Sheets

(58) Field of Classification Search
USPC .................................. 310/156.57, 162, 163
See application file for complete search history.

(56) References Cited

U.S. PATENT DOCUMENTS

| | | |
|---|---|---|
| 2003/0111927 A1 | 6/2003 | Takita et al. |
| 2003/0173861 A1 | 9/2003 | Kawaguchi et al. |
| 2007/0108853 A1* | 5/2007 | Shah .................... H02K 1/246 310/61 |
| 2007/0152527 A1 | 7/2007 | Yura et al. |
| 2007/0170803 A1* | 7/2007 | Yabe ..................... H02K 1/20 310/162 |
| 2010/0001608 A1 | 1/2010 | Kolehmainen |
| 2015/0015093 A1 | 1/2015 | Gontermann et al. |

OTHER PUBLICATIONS

German-language Written Opinion (PCT/ISA/237) issued in PCT Application No. PCT/EP2015/067904 dated Nov. 24, 2015 (six (6) pages).

German Search Report issued in counterpart German Application No. 10 2014 215 303.4 dated Apr. 30, 2015 with partial English-language translation (fourteen (15) pages).

International Preliminary Report on Patentability (PCT/IB/338 & PCT/IB/373) issued in PCT Application No. PCT/EP2015/067904 dated Feb. 16, 2017, including English translation of document C2 (German-language Written Opinion (PCT/ISA/237)) previously filed on Feb. 3, 2017 ( eight pages).

English Translation of Chinese Office Action issued in counterpart Chinese Application No. 201580041723.9 dated May 25, 2018 (five (5) pages).

* cited by examiner

ROTOR AND RELUCTANCE MACHINE

This application is a National Stage of PCT International Application No. PCT/EP2015/067904, filed Aug. 4, 2015, which claims priority under 35 U.S.C. § 119 from German Patent Application No. 10 2014 215 303.4, filed Aug. 4, 2014, the entire disclosures of which are herein expressly incorporated by reference.

BACKGROUND AND SUMMARY OF THE INVENTION

The invention relates to a rotor for a reluctance machine comprising a cylindrical soft-magnetic element, wherein the soft-magnetic element has cutouts for forming magnetic flux barriers and at least some of the cutouts are filled with an electrically conductive and magnetically non-conductive filler material, in order to form a starting cage of the rotor.

Rotors for synchronous reluctance machines are usually equipped with a cylindrical soft-magnetic element which is arranged coaxially on the rotor axis. In order to form at least one pole pair or gap pair, the soft-magnetic element comprises flux-conducting and flux-blocking portions, which differ from one another by a magnetic permeability of differing degrees. The portion with high magnetic conductivity is identified, as is known, as the d-axis of the rotor, and the portion with comparatively lower conductivity is identified as the q-axis of the rotor. An optimal degree of efficacy of the reluctance motor and therefore an optimal torque yield is provided when the d-axis has the greatest possible magnetic conductivity and the q-axis has the lowest possible magnetic conductivity.

This precondition is often satisfied by the formation of a plurality of cutouts, which are filled with air, in the soft-magnetic element along the q-axis, as a result of which the magnetic conductivity decreases and consequently the magnetic flux in the direction of the q-axis is inhibited. The soft-magnetic element constructed in this way is then mounted on a rotor shaft and fixed axially and also tangentially.

For stability reasons, one or more flux barriers is/are divided into two by radially oriented inner webs. The web arrangement increases the strength of the laminated core, which in particular optimizes the rotor stability during operation. The width of the webs is low in order to keep the magnetic permeability in the q-axis as low as possible. Webs, which delimit the flux barriers from the rotor periphery, also run on the outer rotor periphery.

Synchronous reluctance motors are generally fed via a frequency converter, as a result of which the rotation speed can rise from 0 to operating speed and can be adjusted during operation. In particular, the rotation speed for starting the motor can be increased in steps. If the synchronous reluctance motor by contrast is operated in a fixed grid, the use of a starting cage is necessary in order enable asynchronous starting. As soon as the rotation speed of the rotor approaches the synchronous rotation speed, the reluctance torque becomes predominant and the rotor runs synchronously with the magnetic rotating field. However, the structure and manufacture of conventional starting cages, comprising conductor bars and short-circuiting rings, have been comparatively complicated and expensive to date.

The object of the present invention is to develop a rotor for a reluctance machine in such a way that said rotor can be used within a line-start synchronous reluctance machine in a fixed grid.

According to the invention, the rotor of the generic type is developed in such a way that the ratio between the area of the filled regions of the flux barriers and the area of the non-filled regions of the flux barriers for at least one rotor pole, preferably for all of the rotor poles, is at least 0.2.

The area of the filled region of the flux barriers is the filled area which is given by sectioning transverse to the axial axis of the rotor, that is to say the cross-sectional area of the magnetically non-conductive and electrically conductive filler material used. In particular, said area is sum of the area of the filler material for all of the flux barriers of the rotor.

The area of the non-filled flux barriers is given in an analogous manner by the region of the flux barriers which are filled with another filler material or are not filled, for example contain air.

The rotor itself can be designed, for example, as a laminated core, wherein the individual laminate sections are distinguished by the area ratio according to the invention.

In order to form the starting cage, the flux barriers or partial regions of the flux barriers of a radially outer rotor region are filled with the electrically conductive filler material. The inner rotor region which is delimited therefrom comprises the unfilled flux barriers or flux barriers which are provided with the other filler. Ideally, the result is an annular outer rotor region. A critical factor in determining the operating characteristics of the rotor is the ratio of the filled flux barrier area to the non-filled flux barrier area. Investigations have shown that reliable synchronization of the rotor with the frequency of the grid voltage can take place starting from a ratio of at least 0.2.

Aluminum or an aluminum alloy preferably serves as filler material. Materials of this kind can be introduced by casting processes or pressed in by die-casting processes. As an alternative or in addition, it is likewise conceivable to introduce filler materials of this kind into the corresponding cutouts in the rotor geometry already in the form of solid bodies.

The remaining flux barriers, that is to say those which are not filled with a corresponding filler material, can be filled, for example, with a different filler material, for example by a paramagnetic material for reducing the permeability.

In a particularly preferred refinement of the invention, the ratio is in a range of between 0.2 and 3, preferably in a range of between 0.3 and 3, and ideally in a range of between 0.75 and 1.5.

For determining the ratio according to the invention or the advantageous ratio, it may be expedient for only those flux barriers which are at least partially filled with corresponding filler material to be taken into account for calculating the ratio. Furthermore, it is also possible for only those flux barriers of which the ends reach the rotor periphery or come close to said rotor periphery to be included when calculating the ratio. This configuration of the flux barriers is disclosed, for example, by the known "Vagati design", in particular by U.S. Pat. No. 5,818,140, reference being made to said document in its entirety here. In the case of rotor geometries of this kind, both ends of the flux barriers reach the rotor periphery, that is to say the flux barriers are characterized by a banana-shaped design. These flux barriers have a critical influence on the reluctance behavior during rotor operation, and therefore it may be expedient, under certain circumstances, to take into account only flux barriers of this kind for calculating the ratio.

According to a particularly preferred refinement of the invention, it may be advantageous when the ratio between the filled and the non-filled region of the flux barrier which is situated on the inside in the radial direction of the rotor has a value of at least 0.2. This ratio can apply for at least one rotor pole, preferably for all of the flux barrier portions. In a further advantageous refinement, the ratio of the flux barrier which is situated on the inside in the radial direction of the rotor is in the range of between 0.2 and 2, particularly preferably in the range of between 0.35 and 0.8, ideally between 0.35 and 0.6.

Furthermore, it is conceivable that the area of the filled region of the flux barrier which is situated on the inside in the radial direction, which area results on account of the above ratio specification, serves as a measure for the areas of the filled regions of the flux barriers which are situated further on the outside. This means that the area of the filled region at least of one further flux barrier of a rotor pole, which further flux barrier is not the inner flux barrier, corresponds to the area of the filled region of the inner flux barrier or is virtually identical to said area. Under certain circumstances, this precondition cannot be met for the flux barriers with the smallest area since said flux barriers do not provide enough filling space for the area specification. In this case, the area specification applies at least for the partially filled flux barriers.

The invention further relates to a reluctance machine, in particular a synchronous reluctance machine, comprising at least one rotor according to the present invention or an advantageous refinement of the present invention. The properties of the reluctance machine obviously correspond to those of the rotor, and therefore are not described again here.

The machine preferably serves for driving the pump. The invention therefore also includes a pump comprising a reluctance or synchronous reluctance motor according to the present invention.

Owing to the rotor geometry according to the invention and the corresponding filling ratio of the individual flux barriers, it is possible to produce an optimum starting cage, but with the mass of the filler material and therefore the mass of the starting cage formed being kept as small as possible. A line-start synchronous reluctance motor can be formed by the rotor, it being possible to operate said line-start synchronous reluctance motor in a fixed grid without problems and also to start said line-start synchronous reluctance motor without a frequency converter owing to the design of the aluminum cage, and said line-start synchronous reluctance motor running until complete synchronization with the grid voltage.

Other objects, advantages and novel features of the present invention will become apparent from the following detailed description of one or more preferred embodiments when considered in conjunction with the accompanying drawings.

DETAILED DESCRIPTION

Figure 1:
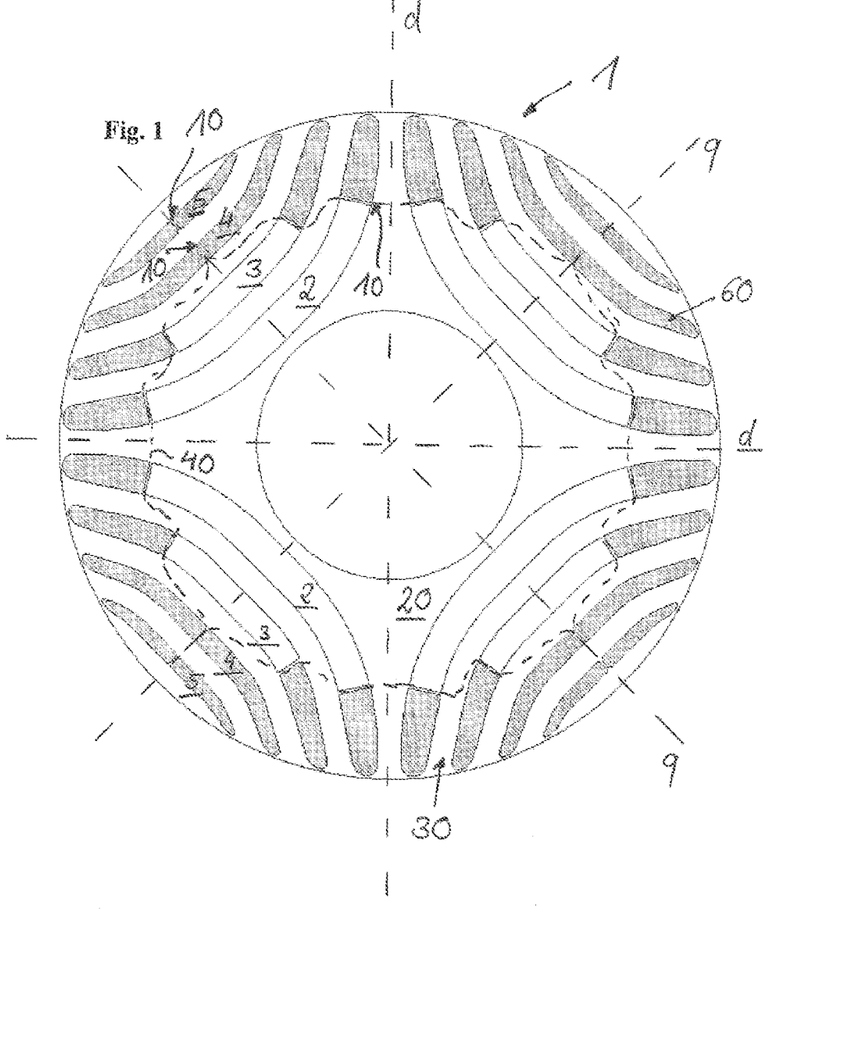
FIG. 1 shows a first exemplary embodiment of the rotor according to an embodiment of the invention.
Figure 2:
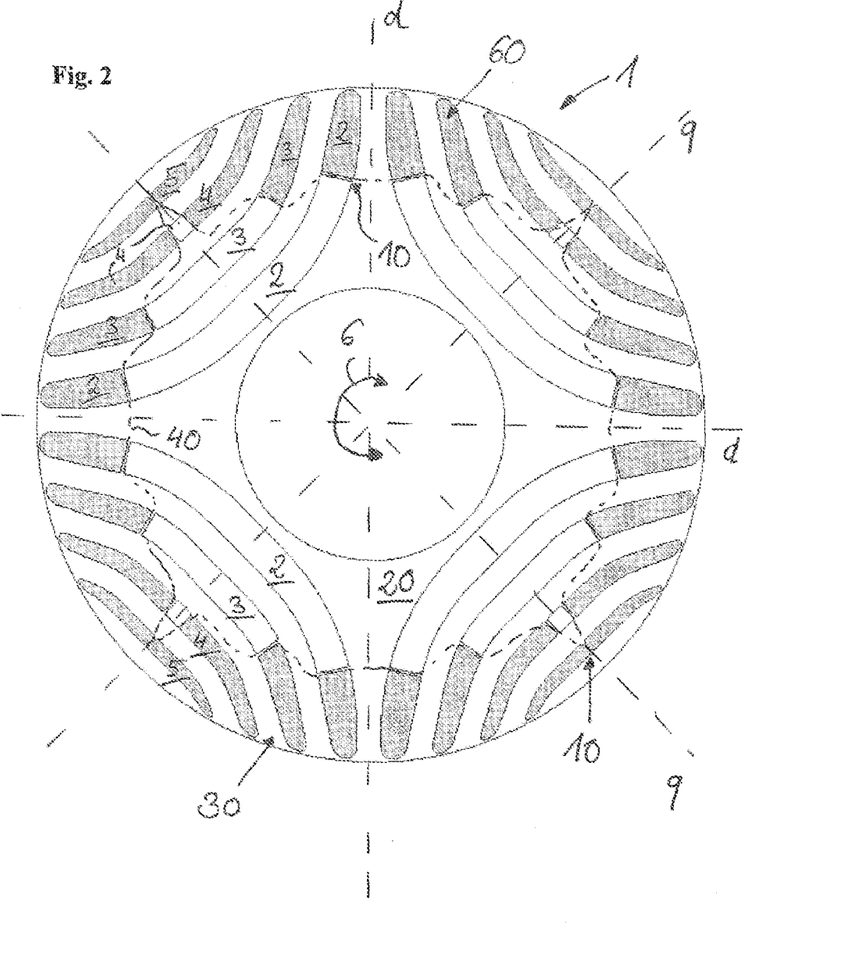
FIG. 2 shows a second exemplary embodiment of the rotor according to the invention.
Figure 3:
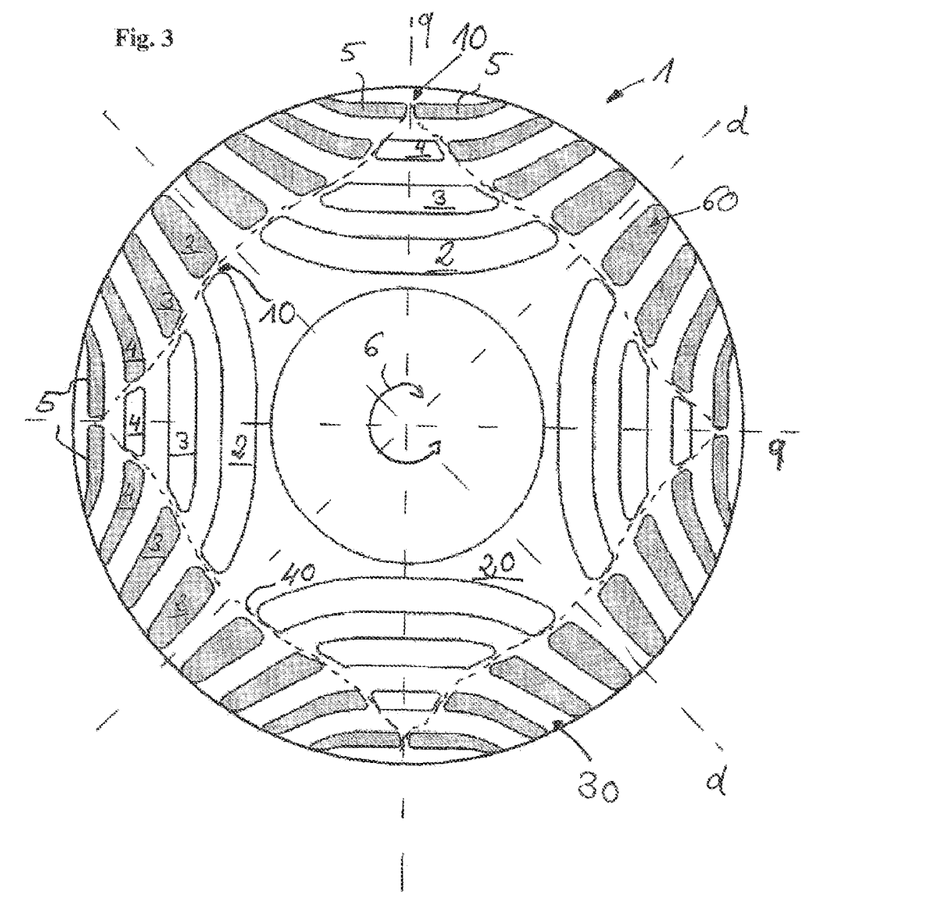
FIG. 3 shows a third exemplary embodiment of the rotor according to the invention.

FIGS. 1 to 3 show plan views of a rotor lamination 1 of different design variants of the rotor according to embodiments of the invention. A large number of laminations 1 of this kind are stacked one on top of the other in an axial direction, that is to say along the rotation axis 6, for the construction of the rotor according to the invention. As an alternative, the rotor can also be designed as a block, the cross section of said block corresponding to the shown illustration of FIGS. 1 to 3.

In order to simplify the illustration, the stator is not shown. The rotor lamination 1 has a plurality of cutouts 2, 3, 4, 5, which take on the function of flux barriers and the arrangement of which forms a four-pole rotor, the magnetic flux of said rotor being inhibited in the regions with the flux barriers 2, 3, 4, 5. The region with high magnetic conductivity is generally identified as the d-axis, and the region of lower magnetic conductivity is generally identified as the q-axis. The assembled laminated core is mounted on a rotor shaft, not illustrated. The arrangement of the individual flux barriers 2, 3, 4, 5 is based on the technical teaching, to which reference is expressly made in this regard. The rotor lamination therefore exhibits four flux barrier portions, wherein the flux barriers in these regions are of identical construction to one another. The flux barriers can be described as banana-shaped, the ends of said flux barriers being curved in the direction of the rotor periphery and reaching the periphery.

However, the rotor construction illustrated differs from the conventional design according to U.S. Pat. No. 5,818, 140 "Vagati" by virtue of the arrangement of the individual webs 10, by which the individual flux barriers 2, 3, 4, 5 are divided into two or more in different portions. One characterizing feature of the embodiments of FIGS. 2 and 3 is that the radially inner flux barriers 2, 3, 4 of each sector of the circle are divided into three by two webs 10, while the outermost flux barrier 5 in the radial direction is divided into two only by one web 10. In contrast to this, in the exemplary embodiment of FIG. 1, the two outer flux barriers 4, 5 are divided into two by one web 10 and the inner flux barriers 2, 3 are divided into three by two webs 10.

The arrangement of the individual webs 10 not only ensures improved lamination stability during rotor operation, but also additionally divides the rotor lamination 1 into an inner partial region 20 and an outer partial region 30. The circular dashed line 40 which indicates the boundary profile between the inner and outer rotor region 20, 30 is shown in order to illustrate the division between regions.

The outer magnetic flux barriers 5 and those partial regions of the flux barriers 2, 3, 4 which are situated in the region 30 serve according to the invention to form a starting cage. To this end, short-circuiting rings, not illustrated, are fastened to or jointly cast at the end face during rotor construction, it being possible for the shape of said short-circuiting rings to be taken, for example in an unchanged form, by the starting cage of an asynchronous machine. Additional provisions which are made for a starting cage, such as the metal rods which are often incorporated, can be dispensed with as a result.

The regions of the flux barriers of the outer rotor region 30 are filled with an electrically conductive and magnetically non-conductive material, in particular with a filler which is composed of aluminum or an aluminum alloy. In the illustration of FIGS. 1 to 3, this is shown by the gray filler color 60. Those flux barrier regions of the flux barriers 2, 3, 4 which are situated in the region 20 can either be filled with a magnetically non-conductive material or only contain air. The filler used should preferably be electrically non-conductive or electrically poorly conductive.

The ratio of the area of the filled region of the flux barriers 2, 3, 4, 5 to the area of the non-filled region of the flux barriers 2, 3, 4 is important for the starting behavior of the rotor, that is to say the synchronization of the rotation speed of the rotor with the grid frequency, in a synchronous reluctance motor. If the fill area is too small, the starting cage formed is too small and a rotor under load cannot start without mechanical assistance. If the filling quantity is selected to be too large, the oscillating mass disadvantageously increases and the operating behavior of the motor is likewise impaired. It is therefore necessary to find an optimum ratio, in particular for the application of the rotor for use in a drive motor of a pump.

For the definition, the area of the filler material which is used for all of the flux barriers 2, 3, 4, 5, which is shown in the lamination cross section, is added up and a ratio is formed to the area of the correspondingly non-filled regions of the flux barrier 2, 3, 4. In the illustrations of FIGS. 1 to 3, this corresponds to the ratio of all of the areas 60, shown in gray, within the flux barriers 2, 3, 4, 5 to the ratio of the non-gray background areas within the flux barriers 2, 3, 4.

A suitable ratio of the area of the filled region of the flux barriers 2, 3, 4, 5 to the area of the region of the non-filled flux barriers 2, 3, 4 has been found to be a value of at least 0.2. The ratio is preferably in the range of between 0.2 and 3, particularly preferably in the range of between 0.3 and 3, ideally in the range of from 0.75 to 1.5.

Furthermore, the areas of the filled regions of the flux barriers 2, 3, 4 are matched to one another, that is to say are selected to be identical. Under certain circumstances, this criterion cannot be complied with for the outermost flux barrier 5 since the area of said outermost flux barrier provides too small a filling space.

A further criterion is that the ratio between the filled region and the non-filled region of the flux barrier 2 which is situated on the inside in the radial direction of the rotor is at least 0.2, preferably in the range of between 0.2 and 2, particularly preferably the range of between 0.35 and 0.8, and ideally between 0.35 and 0.6. In the exemplary embodiment of FIG. 1, this ratio is 0.5, while a smaller ratio for the innermost flux barrier 2, for example of approximately 0.35, has been assumed for the exemplary embodiment of FIG. 3. A ratio of between 0.5 has been set for the exemplary embodiment of FIG. 2.

The area of the filled regions of the partially filled flux barriers 3, 4 which are situated further on the outside in the radial direction is matched in terms of size to the area of the filled region of the inner flux barrier 2 or is virtually identical to said area. In the exemplary embodiment of FIG. 2, the filled area of the flux barrier 4 is not identical to the filled area of the innermost flux barrier 2.

Figure 4:
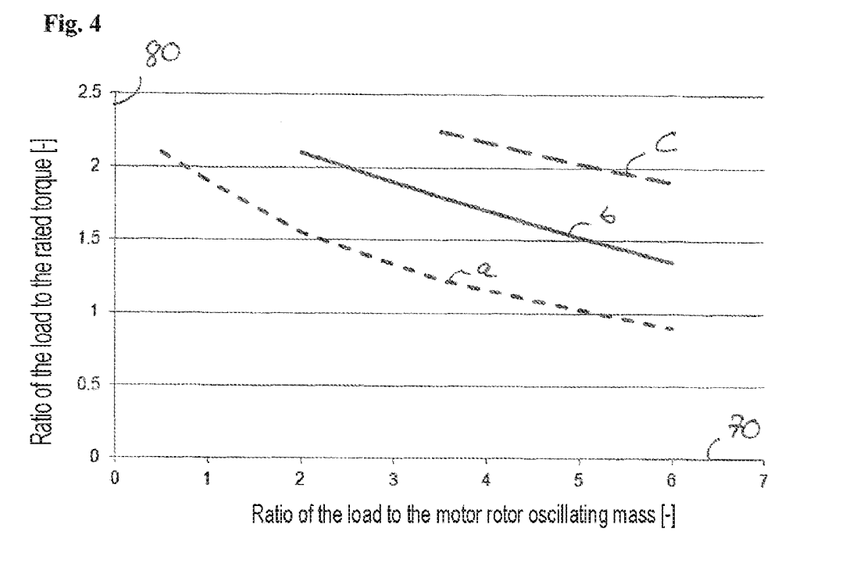
FIG. 4 shows a graph for illustrating the relationship between the area ratio and operating behavior of the rotor or the reluctance machine.

The pull-in boundary characteristic curves for different area ratios in synchronous reluctance rotors is illustrated in FIG. 4. In the illustrated graph, the axis 70 corresponds to the ratio of the load to the motor oscillating mass, and the axis 80 corresponds to the ratio of the load to the rated torque. The areas under the respective curves a, b, c define the regions in which the line-start synchronous reluctance motor reliably starts or can be synchronized. In said graph, curve a characterizes the operating behavior of a rotor which is not covered by the invention and the flux barriers of which are all completely filled with an aluminum or an aluminum alloy.

Curve b shows the operating behavior of a rotor according to the invention with an area ratio of the innermost flux barrier of approximately 0.3. The uppermost characteristic curve c can be associated with the rotor from the exemplary embodiment of FIG. 1 with an area ratio of the innermost flux barrier of 0.5.

FIG. 4 also shows that a considerable improvement in the starting ability of the line-start reluctance motor can be achieved by increasing the size of the region in which the motor is reliably synchronized, or the area under the curves b and c, by optimizing the area ratio in a targeted manner.

Further optimizations of the rotor are discussed below, said optimizations relating to only optional refinements. The flux barrier regions of the outer rotor portion 30 can optionally directly reach the outer periphery of the rotor in the radial direction, so that the rotor periphery is partially formed from the filler material which comprises the aluminum or the aluminum alloy. The previously provided webs at the rotor periphery are no longer present, as a result of which the magnetic resistance of the flux barrier portion is increased and the ratio between the q-axis and the d-axis is optimized. By filling the flux barriers or flux barrier regions which adjoin the rotor periphery, the previously provided webs can first be removed without appreciable losses in stability of the rotor core having to be accepted. In principle, it is not necessary for all of the flux barriers or flux barrier regions which are situated on the outside and adjoin the rotor periphery to be filled. In principle, it is sufficient for the one or more flux barriers in the vicinity of the peripheral region to be filled in order to be able to dispense with the disadvantageous webs in this region. This already results in an improved ratio of the magnetic resistances in the d-axis and q-axis, this leading to an increase in the resulting reluctance torque of the synchronous reluctance motor which uses the rotor. The use of a suitable filler for forming a starting cage and the above-described web arrangement of the webs 10 is merely optional.

It is possible to introduce the filler material into the flux barriers 5 and the outer regions of the flux barriers 2, 3, 4 in different ways. Introduction by casting is possible. It goes without saying that the filler materials can also be inserted into the cutouts 2, 3, 4, 5 in solid form.

Figure 5A:
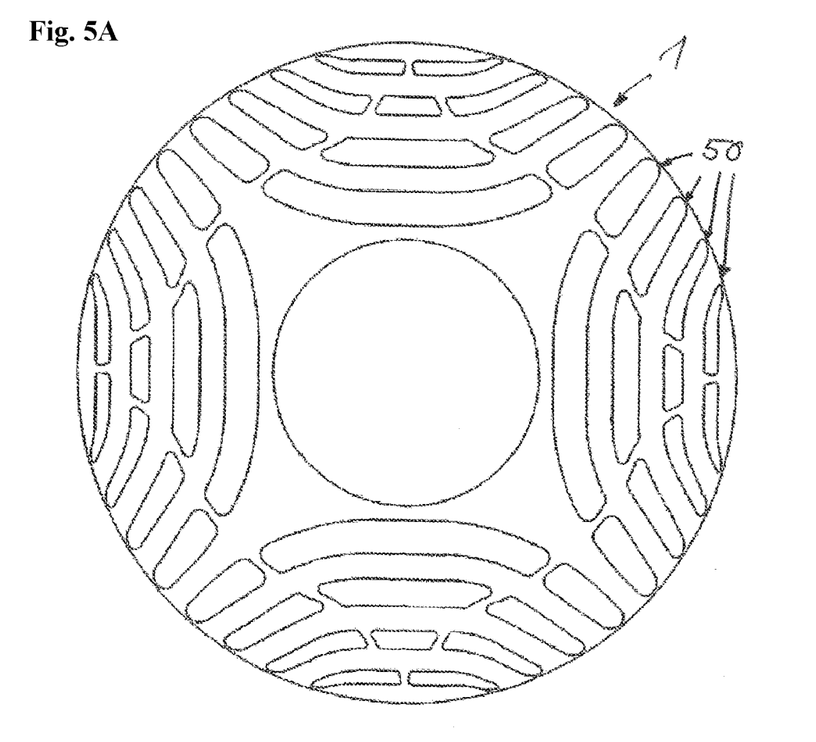
FIGS. 5A and 5B show different illustrations of the rotor lamination according to FIG. 3 during the production process.
Figure 5B:
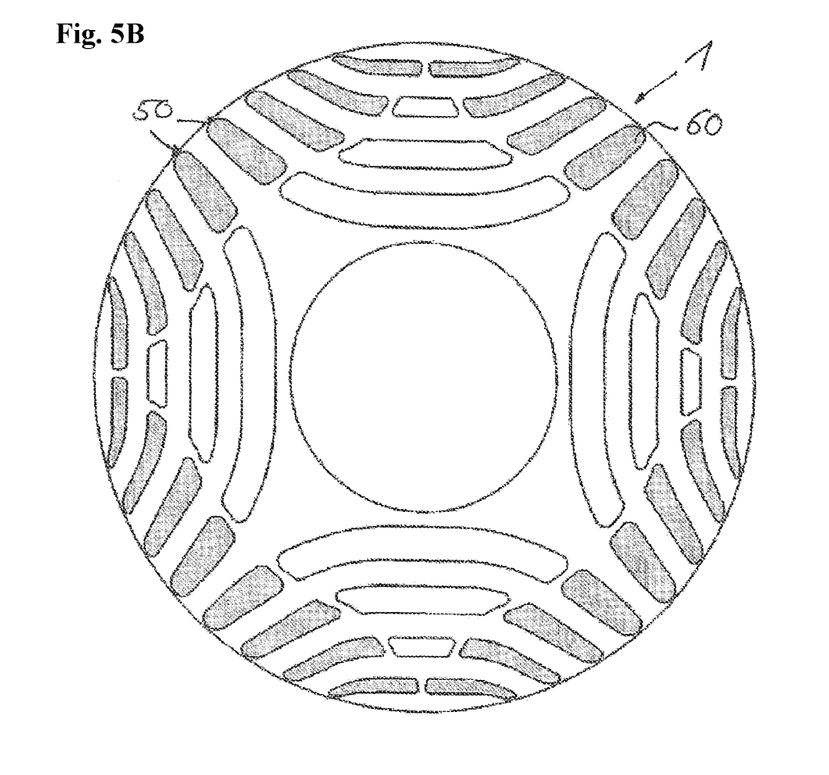

FIGS. 5a and 5b serve to explain an optional manufacturing method for a rotor, preferably a rotor according to one of the design variants of FIGS. 1 to 3. The rotor laminations 1 of the stacked laminated core of the rotor, which laminated core is made up of individual laminations, are produced with the above-described flux barrier arrangement. The inner webs 10, that is to say the webs which subdivide the individual flux barriers and are not situated in the region of the rotor periphery, form the line 40, already described, which divides the rotor into an inner and an outer rotor region 20, 30. However, the rotor lamination 1 is initially produced with outer webs 50 which are shown in the illustration according to FIG. 5a.

The flux barrier portions which are situated in the outer rotor region 30 are then filled with aluminum or an aluminum alloy, wherein an aluminum die-casting process is substantially used here. In the process, the aluminum or the aluminum alloy is pressed into the flux barrier portions of the outer rotor region 30. A rotor lamination according to the illustration of FIG. 5b is produced.

In a subsequent method step, the rotor is turned, so that the diameter of the lamination reduces and the periphery shrinks. The material layer which forms the outer webs 50 disappears and the two ends of the banana-shaped flux barriers 2, 3, 4, 5 directly adjoin the rotor periphery, that is to say the aluminum or the aluminum alloy is open to the periphery and forms a portion of the rotor periphery. The result corresponds to the illustration according to FIG. 3. Owing to the respective webs 50 in this region disappearing, the magnetic conductivity along the q-axis is reduced and therefore the ratio between the magnetic resistances along the q-axis and the d-axis is optimized. Furthermore, owing to the presence of the aluminum cage in the region of the outer rotor portion 30, the mechanical strength is achieved even without these outer webs 50 of the laminated rotor core. The manufacturing method can be used without restriction for manufacturing any rotor of the exemplary embodiments according to FIGS. 1 to 3.

The inner webs 10 also have a negative effect on the ratio between the magnetic resistances in the d-axis and the q-axis, and therefore the number and the material thickness thereof should be kept as low as possible. However, the inner webs 10 are required for ensuring the stability of the rotor. As the filler material, that is to say the aluminum or the aluminum alloy, is introduced or pressed into the flux barriers 5 or the flux barrier portions 2, 3, 4 in the outer rotor segment 30, high forces act on the webs 10 of the flux barriers which are to be filled, as a result of which the inner webs 10 may be damaged.

Figure 6:
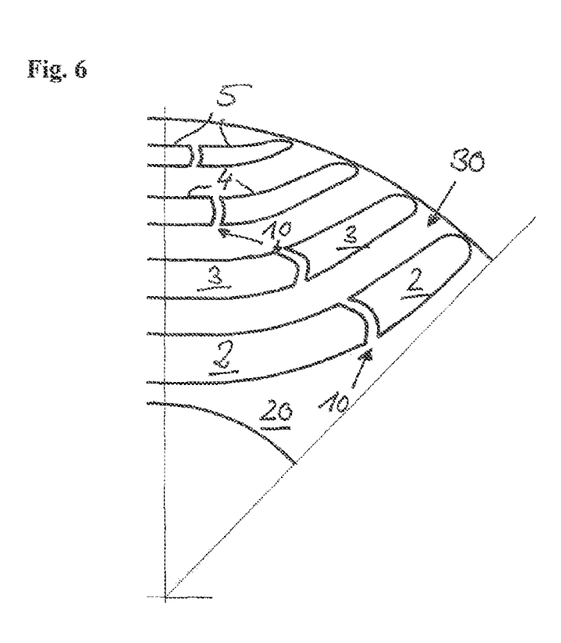
FIG. 6 shows a detail of the rotor according to the invention in accordance with the embodiments of FIGS. 1, 2 and 3.

Instead of making the dimensions of the webs 10 thicker, said webs are now designed in arcuate form, as is clear from the view of a detail in FIG. 6. Said view shows one eighth of the rotor lamination according to one of FIGS. 1 to 3. The remaining rotor region is symmetrical to the illustration of FIG. 6.

The arcuate ribs 10 stabilize the rotor during the aluminum die-casting operation. Aluminum is pressed into the flux barriers 5 and flux barrier regions of the flux barriers 2, 3, 4, which flux barriers and flux barrier regions are situated in the outer region 30, under high pressure, while normal ambient pressure prevails on the inside. As a result, a compressive stress which stabilizes the rotor is built up in the arcuate ribs. Therefore, the rotor structure can be effectively prevented from collapsing.

In particular, the arcuate rib structure exhibits a curvature into the filled flux barrier region, so that the pressure of the aluminum die-casting counteracts the arc. Therefore, the thickness of the inner ribs 10 can be further reduced, as a result of which these can nevertheless withstand the high pressure of the aluminum during casting. The arcuate rib structure described can be used without restriction for any of the exemplary embodiments according to FIGS. 1 to 3 independently of the manufacturing method of FIGS. 5*a* and 5*b*.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A rotor for a reluctance machine, comprising:
   a cylindrical soft-magnetic element; and
   a filler material, the filler material being electrically conductive and magnetically non-conductive,
   wherein
   the soft-magnetic element includes a plurality of flux barriers in the form of cutouts arranged circumferentially about a rotational axis of the rotor,
   at least one of the flux barriers is at least partially filled with the filler material in a manner such that a starting cage is formed in a peripheral region of rotor; and
   a ratio of an area of a filled region of flux barriers to an area of a region of non-filled flux barriers for at least one rotor pole is at least 0.2,
   a ratio between an area of a filled portion of at least one of the plurality of flux barriers to an area of a non-filled portion of the at least one of the plurality of flux barriers is between 0.35 and 0.6.

2. The rotor as claimed in claim 1, wherein
the ratio is between 0.2 and 3.

3. The rotor as claimed in claim 1, wherein
the ratio is between 0.3 and 3.

4. The rotor as claimed in claim 1, wherein
the ratio is between 0.75 to 1.5.

5. The rotor as claimed in claim 1, wherein
only filler material-containing flux barriers of the at least one flux barrier containing filler material and flux barriers of the plurality of flux barriers having ends extending to a radially outer surface of the rotor are included in the area of the filled region of flux barriers used to determine the ratio.

6. The rotor as claimed in claim 5, wherein
an area of the filler material in the filler material-containing flux barriers in the filled region is the same in all of said filler material-containing flux barriers.

7. The rotor as claimed in claim 6, wherein
the filler material is aluminum or an aluminum alloy.

8. The rotor as claimed in claim 1, wherein
the area of the filler material in the filled portion of at least one of the plurality of flux barriers is the same the area of the non-filled portion of the at least one of the plurality of flux barriers in the non-filled region.

9. The rotor as claimed in claim 1, wherein
one or more flux barriers of the plurality of flux barriers is are divided by one or more webs, and
at least one of the one or more webs has a first arcuate curved edge facing into a portion of said one or more flux barriers portion of said flux barrier which leading to the radially outer surface of the rotor.

10. The rotor as claimed in 9, wherein
the first arcuate curved edge is convex in a direction along the flux barrier leading to the radially outer surface of the rotor.

11. The rotor as claimed in claim 10, wherein
the at least one or more webs has a second arcuate curved edge facing into a second portion of said flux barrier extending in a direction leading away from the radially outer surface of the rotor,
the second arcuate curved edge faces into a non-filled region of the flux barrier in the inner region of the rotor.

12. A synchronous reluctance machine, comprising
at least one rotor as claimed in claim 1,
wherein the machine does not include a frequency converter.

* * * * *